United States Patent
Morgan et al.

(10) Patent No.: US 8,090,994 B2
(45) Date of Patent: Jan. 3, 2012

(54) SYSTEM, METHOD, AND COMPUTER READABLE MEDIA FOR IDENTIFYING A LOG FILE RECORD IN A LOG FILE

(75) Inventors: Fabian F. Morgan, Austin, TX (US); Sheryl S. Kinstler, Dripping Springs, TX (US); David A. Cox, Sugar Grove, IL (US); Danny Yen-Fu Chen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 451 days.

(21) Appl. No.: 12/124,235

(22) Filed: May 21, 2008

(65) Prior Publication Data

US 2009/0292742 A1 Nov. 26, 2009

(51) Int. Cl.
*G06F 11/00* (2006.01)
(52) U.S. Cl. ............................................. 714/45; 714/39
(58) Field of Classification Search .................... 714/37, 714/39, 45, 47, 38, 47.3; 379/9.03, 9.04
See application file for complete search history.

(56) References Cited

U.S. PATENT DOCUMENTS

| | | | |
|---|---|---|---|
| 5,847,972 A | 12/1998 | Eick et al. | |
| 6,816,576 B2* | 11/2004 | Kasvand et al. | 379/9.04 |
| 6,847,983 B2 | 1/2005 | Somalwar et al. | |
| 6,996,843 B1 | 2/2006 | Moran | |
| 7,139,744 B2 | 11/2006 | Tran et al. | |
| 7,206,835 B2 | 4/2007 | Kusumoto et al. | |
| 7,216,336 B1 | 5/2007 | Ezra et al. | |
| 7,340,037 B1* | 3/2008 | Jean et al. | 379/9.02 |
| 7,483,810 B2* | 1/2009 | Jackson et al. | 702/176 |
| 7,506,195 B2 | 3/2009 | Takahashi et al. | |
| 7,676,760 B1 | 3/2010 | Rosenquist et al. | |
| 7,797,585 B1* | 9/2010 | Sahin et al. | 714/45 |
| 2001/0016849 A1 | 8/2001 | Squibbs | |
| 2002/0174083 A1 | 11/2002 | Hellerstein et al. | |
| 2003/0236766 A1 | 12/2003 | Fortuna et al. | |
| 2005/0278324 A1 | 12/2005 | Fan et al. | |

(Continued)

OTHER PUBLICATIONS

U.S. Appl. No. 12/109,516, Final Office Action mail date Apr. 15, 2011.

(Continued)

*Primary Examiner* — Joshua Lohn
(74) *Attorney, Agent, or Firm* — Cantor Colburn LLP; Mark Vallone

(57) ABSTRACT

A system, a method, and a computer readable media for identifying a log file record in a log file are provided. The log file has a plurality of log file records therein. The plurality of log file records has a repeating pattern of log file records. The method includes displaying a first graphical user interface on a display device. The method further includes selecting the log file utilizing the first graphical user interface. The method further includes analyzing the log file to determine the repeating pattern of log file records. The method further includes selecting a first command button on the first graphical user interface that executes an algorithm to analyze additional log file records that were automatically added to the log file by a software program. The additional log file records are associated with the repeating pattern of log file records. The method further includes storing the first log file record in a memory device if a first log file record in the additional log file records has at least one command-related attribute that does not correspond to command-related attributes in the repeating pattern of log file records.

20 Claims, 9 Drawing Sheets

U.S. PATENT DOCUMENTS

| | | |
|---|---|---|
| 2006/0184529 A1 | 8/2006 | Berg et al. |
| 2007/0112953 A1* | 5/2007 | Barnett ......................... 709/224 |
| 2007/0157315 A1 | 7/2007 | Moran |
| 2007/0209075 A1* | 9/2007 | Coffman ......................... 726/23 |
| 2007/0258106 A1 | 11/2007 | Ishiyama et al. |
| 2007/0260932 A1* | 11/2007 | Prichard et al. ................. 714/39 |
| 2007/0271276 A1 | 11/2007 | Allen et al. |
| 2007/0294271 A1 | 12/2007 | Bammi et al. |
| 2008/0155564 A1 | 6/2008 | Shcherbina et al. |
| 2009/0089233 A1 | 4/2009 | Gach et al. |

OTHER PUBLICATIONS

U.S. Appl. No. 12/109,516, Non-Final Office Action mail date Sep. 30, 2010.

* cited by examiner

72 — [11/18/07 14:45:10:000 CST] 0000002f SystemOut     O 18 Nov 2007 14:45:10:000
[INFO] USER = (MAXADMIN) (PROBLEM) :select * from problem where (orgid= 'IBM' )
and status = 'CLOSED' and notificationsent = 0

74 — [11/18/07 15:00:00:000 CST] 0000002f SystemOut     O 18 Nov 2007 15:00:00:000
[INFO] USER = (MAXADMIN) (INCIDENT) :select * from incident where (orgid=
'EAGLENA' ) and reportdate <= { ts '2007-11-18 14:30:00' } and status = 'NEW'

76 — [11/18/07 15:00:10:000 CST] 0000002f SystemOut     O 18 Nov 2007 15:00:10:000
[INFO] USER = (MAXADMIN) (PROBLEM) :select * from problem where (orgid= 'IBM' )
and status = 'CLOSED' and notificationsent = 0

78 — [11/18/07 15:05:00:000 CST] 0000002f SystemOut     O 18 Nov 2007 15:05:00:000
[INFO] USER = (MAXADMIN) (WOCHANGE) :select * from wochange where (orgid=
'BEDFORD' ) and reportdate <= { ts '2007-11-18 14:05:00' } and status = 'WAPPR'

80 — [11/18/07 15:10:00:000 CST] 0000002f SystemOut     O 18 Nov 2007 15:10:00:000
[INFO] USER = (MAXADMIN) (INCIDENT) :select * from incident where (orgid=
'EAGLENA' ) and reportdate <= { ts '2007-11-18 14:40:00' } and status = 'NEW'

82 — [11/18/07 15:15:10:000 CST] 0000002f SystemOut     O 18 Nov 2007 15:15:10:000
[INFO] USER = (MAXADMIN) (PROBLEM) :select * from problem where (orgid= 'IBM' )
and status = 'CLOSED' and notificationsent = 0

84 — [11/18/07 15:20:00:000 CST] 0000002f SystemOut     O 18 Nov 2007 15:20:00:000
[INFO] USER = (MAXADMIN) (INCIDENT) :select * from incident where (orgid=
'EAGLENA' ) and reportdate <= { ts '2007-11-18 14:50:00' } and status = 'NEW'

86 — [11/18/07 15:30:00:000 CST] 0000002f SystemOut     O 18 Nov 2007 15:30:00:000
[INFO] USER = (MAXADMIN) (INCIDENT) :select * from incident where (orgid=
'EAGLENA' ) and reportdate <= { ts '2007-11-18 15:00:00' } and status = 'NEW'

FIG. 3

88 — [11/18/07 15:30:10:000 CST] 0000002f SystemOut    O 18 Nov 2007 15:30:10:000
[INFO] USER = (MAXADMIN) (PROBLEM) :select * from problem where (orgid= 'IBM' )
and status = 'CLOSED' and notificationsent = 0

90 — [11/18/07 15:45:00:000 CST] 0000002f SystemOut    O 18 Nov 2007 15:45:00:000
[INFO] USER = (MAXADMIN) (WOCHANGE) :select * from wochange where (orgid=
'BEDFORD' ) and reportdate <= { ts '2007-11-18 14:45:00' } and status = 'WAPPR'

92 — [11/18/07 16:25:00:000 CST] 0000002f SystemOut    O 18 Nov 2007 16:25:00:000
[INFO] USER = (MAXADMIN) (WOCHANGE) :select * from wochange where (orgid=
'BEDFORD' ) and reportdate <= { ts '2007-11-18 15:25:00' } and status = 'WAPPR'

94 — [11/18/07 17:05:00:000 CST] 0000002f SystemOut    O 18 Nov 2007 17:05:00:000
[INFO] USER = (MAXADMIN) (WOCHANGE) :select * from wochange where (orgid=
'BEDFORD' ) and reportdate <= { ts '2007-11-18 16:05:00' } and status = 'WAPPR'

FIG. 3
(CONTINUED)

72 — AAA - [11/18/07 14:45:10:000 CST] 0000002f SystemOut    O 18 Nov 2007
14:45:10:000 [INFO] USER = (MAXADMIN) (PROBLEM) :select * from problem where
(orgid= 'IBM' ) and status = 'CLOSED' and notificationsent = 0

74 — BBB - [11/18/07 15:00:00:000 CST] 0000002f SystemOut    O 18 Nov 2007
15:00:00:000 [INFO] USER = (MAXADMIN) (INCIDENT) :select * from incident where
(orgid= 'EAGLENA' ) and reportdate <= { ts '2007-11-18 14:30:00' } and status = 'NEW'

78 — CCC - [11/18/07 15:05:00:000 CST] 0000002f SystemOut    O 18 Nov 2007
15:05:00:000 [INFO] USER = (MAXADMIN) (WOCHANGE) :select * from wochange
where (orgid= 'BEDFORD' ) and reportdate <= { ts '2007-11-18 14:05:00' } and status =
'WAPPR'

FIG. 4

150 — [11/18/07 18:45:10:000 CST] 0000002f SystemOut    O 18 Nov 2007 18:45:10:000
[INFO] USER = (MAXADMIN) (PROBLEM) :select * from problem where (orgid= 'IBM' )
and status = 'CLOSED' and notificationsent = 0

152 — [11/18/07 19:00:00:000 CST] 0000002f SystemOut    O 18 Nov 2007 19:00:00:000
[INFO] USER = (MAXADMIN) (INCIDENT) :select * from incident where (orgid=
'EAGLENA' ) and reportdate <= { ts '2007-11-18 18:30:00' } and status = 'NEW'

154 — [11/18/07 19:00:10:000 CST] 0000002f SystemOut    O 18 Nov 2007 19:00:10:000
[INFO] USER = (MAXADMIN) (PROBLEM) :select * from problem where (orgid= 'IBM' )
and status = 'CLOSED' and notificationsent = 0

156 — [11/18/07 19:05:00:000 CST] 0000002f SystemOut    O 18 Nov 2007 19:05:00:000
[INFO] USER = (MAXADMIN) (WOCHANGE) :select * from wochange where (orgid=
'BEDFORD' ) and reportdate <= { ts '2007-11-18 18:05:00' } and status = 'WAPPR'

158 — [11/18/07 19:10:00:000 CST] 0000002f SystemOut    O 18 Nov 2007 19:10:00:000
[INFO] USER = (MAXADMIN) (INCIDENT) :select * from incident where (orgid=
'EAGLENA' ) and reportdate <= { ts '2007-11-18 18:40:00' } and status = 'NEW'

160 — [11/18/07 19:15:10:000 CST] 0000002f SystemOut    O 18 Nov 2007 19:15:10:000
[INFO] USER = (MAXADMIN) (PROBLEM) :select * from problem where (orgid= 'IBM' )
and status = 'CLOSED' and notificationsent = 0

162 — [11/18/07 19:20:00:000 CST] 0000002f SystemOut    O 18 Nov 2007 19:20:00:000
[INFO] USER = (MAXADMIN) (INCIDENT) :select * from incident where (orgid=
'EAGLENA' ) and reportdate <= { ts '2007-11-18 18:25:00' } and status = 'NEW'

164 — [11/18/07 19:30:00:000 CST] 0000002f SystemOut    O 18 Nov 2007 19:30:00:000
[INFO] USER = (MAXADMIN) (INCIDENT) :select * from incident where (orgid=
'EAGLENA' ) and reportdate <= { ts '2007-11-18 18:35:00' } and status = 'NEW'

FIG. 6

166 — [11/18/07 19:30:10:000 CST] 0000002f SystemOut    O 18 Nov 2007 19:30:10:000
[INFO] USER = (MAXADMIN) (PROBLEM) :select * from problem where (orgid= 'IBM' )
and status = 'CLOSED' and notificationsent = 0

168 — [11/18/07 19:45:00:000 CST] 0000002f SystemOut    O 18 Nov 2007 19:45:00:000
[INFO] USER = (MAXADMIN) (WOCHANGE) :select * from wochange where (orgid=
'BEDFORD' ) and reportdate <= { ts '2007-11-18 18:45:00' } and status = 'WAPPR'

170 — [11/18/07 20:25:00:000 CST] 0000002f SystemOut    O 18 Nov 2007 20:25:00:000
[INFO] USER = (MAXADMIN) (WOCHANGE) :select * from wochange where (orgid=
'BEDFORD' ) and reportdate <= { ts '2007-11-18 19:25:00' } and status = 'WAPPR'

172 — [11/18/07 21:05:00:000 CST] 0000002f SystemOut    O 18 Nov 2007 21:05:00:000
[INFO] USER = (MAXADMIN) (WOCHANGE) :select * from wochange where (orgid=
'BEDFORD' ) and reportdate <= { ts '2007-11-18 20:05:00' } and status = 'WAPPR'

FIG. 6
(CONTINUED)

162 — [11/18/07 19:20:00:000 CST] 0000002f SystemOut    O 18 Nov 2007 19:20:00:000
[INFO] USER = (MAXADMIN) (INCIDENT) :select * from incident where (orgid=
'EAGLENA' ) and reportdate <= { ts '2007-11-18 18:25:00' } and status = 'NEW'

164 — [11/18/07 19:30:00:000 CST] 0000002f SystemOut    O 18 Nov 2007 19:30:00:000
[INFO] USER = (MAXADMIN) (INCIDENT) :select * from incident where (orgid=
'EAGLENA' ) and reportdate <= { ts '2007-11-18 18:35:00' } and status = 'NEW'

FIG. 7

SYSTEM, METHOD, AND COMPUTER READABLE MEDIA FOR IDENTIFYING A LOG FILE RECORD IN A LOG FILE

FIELD OF INVENTION

This application relates to a system, a method, and a computer readable media for identifying a log file record in a log file that has a command-related attribute that differs from command-related attributes in an associated repeating pattern of log file records.

BACKGROUND OF INVENTION

It is typical for customers to enter into a Service Level Agreement (SLA) with a software service provider. An SLA agreement generally defines a minimum standard of service that the software service provider must meet, and usually describe penalties, such as monetary fines, if the provider fails to meet the minimum standard of service. The SLA agreement may also indicate additional payments from the customer to the software service provider if the service provider greatly exceeds the minimum standard of service. For example, the SLA could indicate that: (i) a company's computer servers must have a minimum 98% uptime, (ii) all high level problem tickets must be resolved in an average of 8 hours, and (iii) work must begin on all problem tickets no later than one hour after reported.

Regarding the problem tickets, it is common for IT departments to use Service Management Software such as IBM's Maximo to monitor a status of all problem tickets at a predefined time interval. Thus, for example, the software may confirm on a 10-minute interval, whether there are any problem tickets that were opened more than 30 minutes ago, that are not assigned to any work group. If the software finds such a problem ticket, the software can be configured to automatically assign it to a work group so that the work group can resolve the associated problem.

As an example, the following three SQL statements below determines if there are any problem tickets that were opened more than 30 minutes ago (by looking at the REPORTDATE field) that have yet to be assigned (status='NEW'):

[Nov. 18, 2007 15:00:00:000 CST] 0000002f SystemOut O 18 Nov. 2007 15:00:00:000 [INFO] USER=(MAXADMIN) (INCIDENT):select*from incident where (orgid='EAGLENA') and reportdate<={ts 'Nov. 18, 2007 14:30:00'} and status='NEW'

[Nov. 18, 2007 15:10:00:000 CST] 0000002f SystemOut O 18 Nov. 2007 15:10:00:000 [INFO] USER=(MAXADMIN) (INCIDENT):select*from incident where (orgid='EAGLENA') and reportdate<={ts 'Nov. 18, 2007 14:40:00'} and status='NEW'

[Nov. 18, 2007 15:20:00:000 CST] 0000002f SystemOut O 18 Nov. 2007 15:20:00:000 [INFO] USER=(MAXADMIN) (INCIDENT):select*from incident where (orgid='EAGLENA') and reportdate<={ts 'Nov. 18, 2007 14:50:00'} and status='NEW'

Because the conditions checked by the Service Management Software may be set up manually, there is a possibility that a user may incorrectly enter in the criteria, based on a miscommunication or a mistake. For example, if a user changes the software configuration to check for problem tickets that were opened more than an hour ago (instead of 30 minutes ago), the user modification could result in the SLA being breached resulting in possible financial penalties.

Accordingly, the inventors herein have recognized that it would be desirable to automatically determine whether log file records associated with SLA commands have command-related attributes that have been modified by a user. This occurs when the log file commands have command-related attributes that differ from command-related attributes in a previous pattern of log file commands in a log file. Further, the inventors herein have recognized that it would be desirable to notify another user when log file records have command-related attributes that have been modified by the user.

SUMMARY OF INVENTION

A method for identifying a log file record in a log file in accordance with an exemplary embodiment is provided. The log file has a plurality of log file records therein. The plurality of log file records has a repeating pattern of log file records. The method includes displaying a first graphical user interface on a display device. The method further includes selecting the log file utilizing the first graphical user interface. The method further includes analyzing the log file to determine the repeating pattern of log file records. The method further includes selecting a first command button on the first graphical user interface that executes an algorithm to analyze additional log file records that were automatically added to the log file by a software program. The additional log file records are associated with the repeating pattern of log file records. The method further includes storing the first log file record in a memory device if a first log file record in the additional log file records has at least one command-related attribute that does not correspond to command-related attributes in the repeating pattern of log file records.

A system for identifying a log file record in a log file in accordance with another exemplary embodiment is provided. The log file has a plurality of log file records. The plurality of log file records has a repeating pattern of log file records. The system includes a memory device having the log file stored therein. The system further includes a computer operably communicating with the memory device. The computer is configured to display a first graphical user interface on a display device. The first graphical user interface is configured to allow a user to select the log file. The computer is further configured to analyze the log file to determine the repeating pattern of log file records. The first graphical user interface is further configured to allow the user to select a first command button on the first graphical user interface that executes an algorithm to analyze additional log file records that were automatically added to the log file by a software program. The additional log file records are associated with the repeating pattern of log file records. The computer further is configured to determine when a first log file record in the additional log file records has at least one command-related attribute that does not correspond to command-related attributes in the repeating pattern of log file records, and then to store the first log file record in the memory device.

One or more computer readable media having computer-executable instructions that implement a method for identifying a log file record in a log file in accordance with another exemplary embodiment is provided. The log file has a plurality of log file records therein. The plurality of log file records has a repeating pattern of log file records. The method includes displaying a first graphical user interface on a display device. The method further includes selecting the log file utilizing the first graphical user interface. The method further includes analyzing the log file to determine the repeating pattern of log file records. The method further includes selecting a first command button on the first graphical user interface that executes an algorithm to analyze additional log file records that were automatically added to the log file by a software program. The additional log file records are associated with the repeating pattern of log file records. The method further includes storing the first log file record in a memory device if a first log file record in the additional log file records has at least one command-related attribute that does not correspond to command-related attributes in the repeating pattern of log file records.

BRIEF DESCRIPTION OF DRAWINGS

FIG. 3 is a schematic of exemplary log file records in a log file corresponding to three repeating patterns of log file records;

FIG. 4 is a schematic of three log file records corresponding to the three repeating patterns of log file records in the log file of FIG. 3 that are displayed in the graphical user interface of FIG. 2;

FIG. 6 is a schematic of exemplary log file records that are added to the log file of FIG. 3;

FIG. 7 is a schematic of two log file records from the log file of FIG. 6 that have command-related attributes that do not correspond to command-related attributes in the repeating patterns of log file records.

DESCRIPTION OF EXEMPLARY EMBODIMENTS

Figure 1:
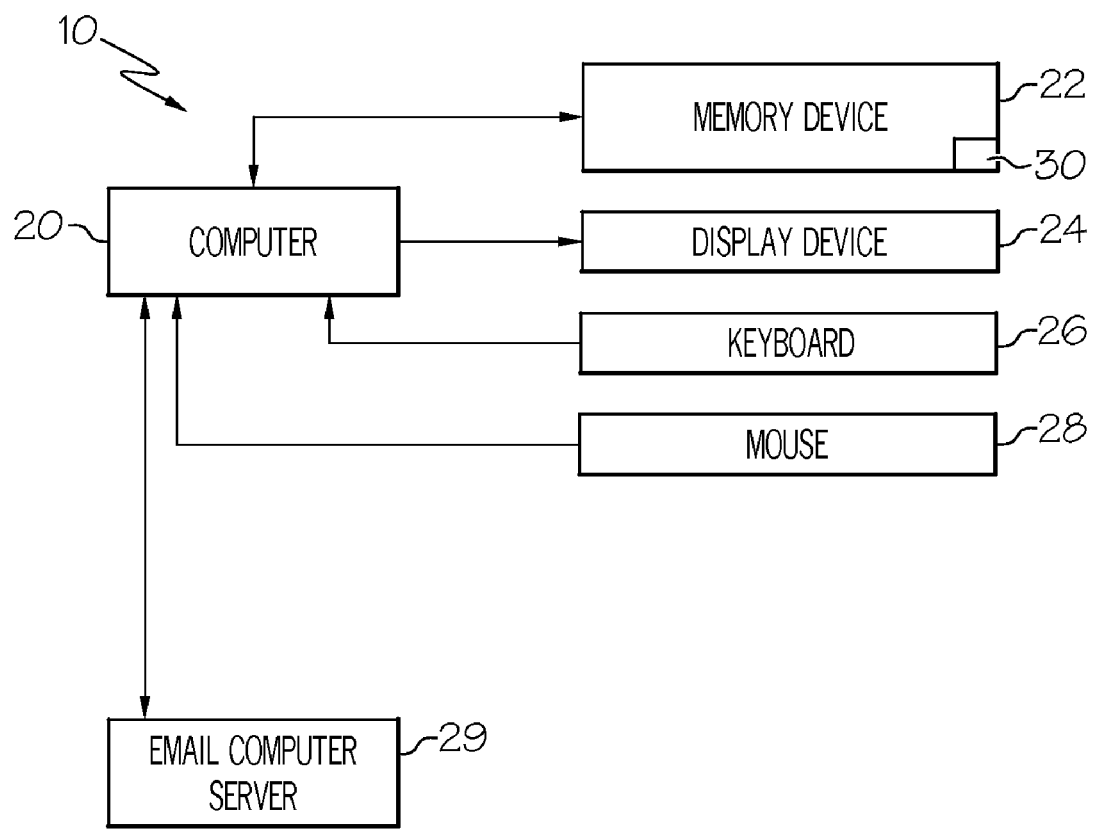
FIG. 1 is a schematic of a system for identifying a log file record in a log file in accordance with an exemplary embodiment.

Referring to FIG. 1, a system 10 for identifying a log file record in a log file is illustrated. The system 10 includes a computer 20, a memory device 22, a display device 24, a keyboard 26, a mouse 28, and an email computer server 29. An advantage of the system 10 is that the system 10 can identify a log file record in a log file that has command-related attributes that differ from command-related attributes in a corresponding repeating pattern of log file records.

The computer 20 is configured to execute software routines for identifying log file records in a log file 30 that have command-related attributes that differ from command-related attributes in a corresponding repeating pattern of log file records. The computer 20 is operably coupled to the memory device 22, the display device 24, the keyboard 26, the mouse 28, and the email computer server 29. The computer 20 is further configured to induce the display device 24 to display graphical user interfaces thereon which will be utilized by the computer 20 for identifying the log file records.

The memory device 22 is configured to store data generated by the computer 20. In particular, the memory device 22 is configured to store the log file 30 generated by the computer 20.

The display device 24 is configured to display graphical user interfaces and data generated by the computer 20.

The keyboard 26 is configured to allow a user to input data on graphical user interfaces displayed on the display device 24. The keyboard 26 is operably coupled to the computer 20.

The mouse 28 is configured to allow a user to select items on graphical user interfaces displayed on the display device 24. The mouse 28 is operably coupled to the computer 20.

The email computer server 29 is configured to receive an email from the computer 20 and to send the email to a predetermined email account as will be described in greater detail below.

Figure 2:
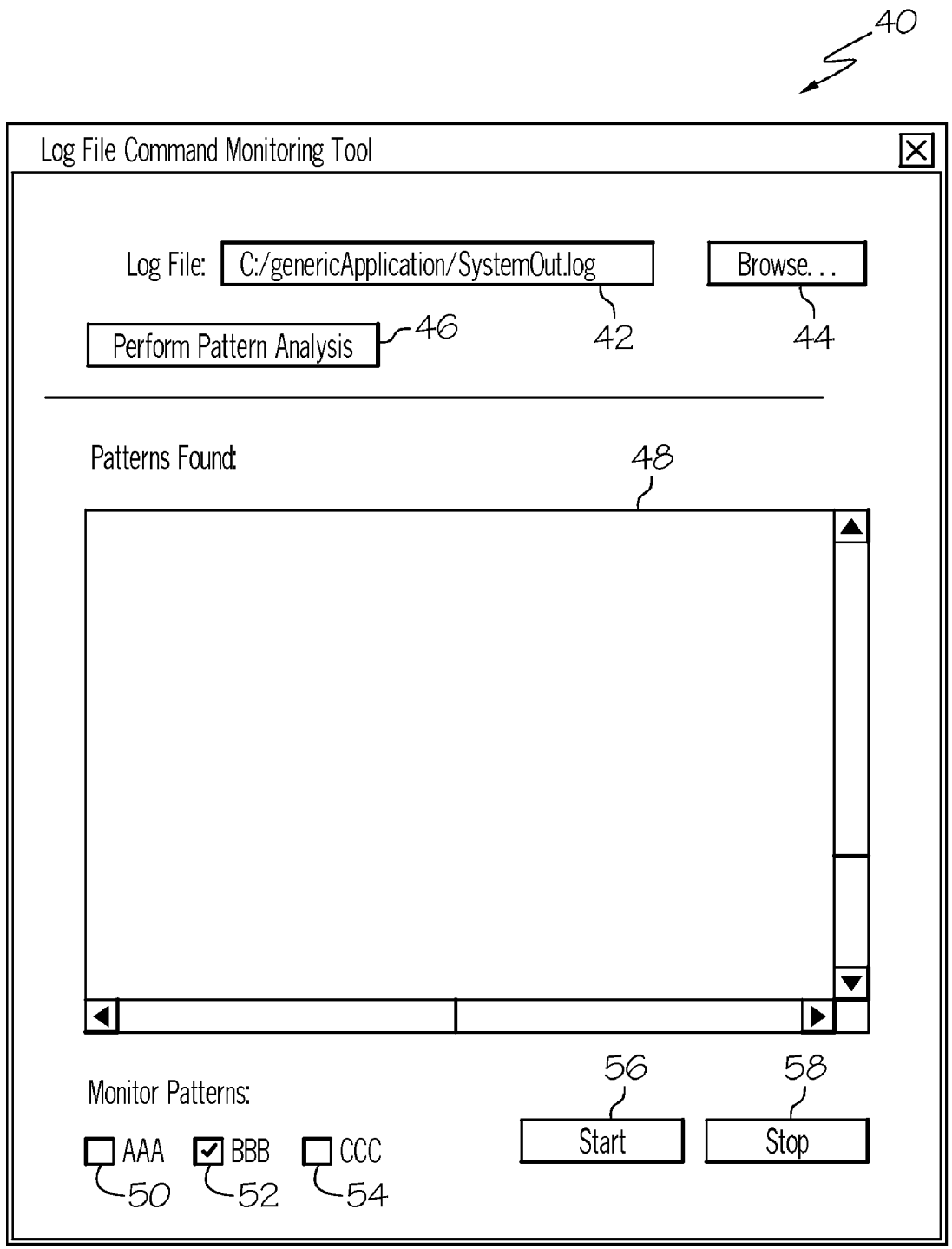
FIG. 2 is a schematic of a graphical user interface generated by the system of FIG. 1.

Referring to FIG. 2, a graphical user interface 40 is configured to display a subset of log file records in the log file 30 wherein each displayed log file record corresponds to a repeating pattern of log file records in the log file 30. The graphical user interface 40 includes a log file text box 42, a browse command button 44, a perform pre-analysis command button 46, a text frame 48, pattern selection checkboxes 50, 52, 54, a start command button 56, and a stop command button 58.

The log file text box 42 is configured to allow a user to input a directory path and file name of the log file 30 therein, utilizing the keyboard 26, such that the computer 20 can access the log file 30 in the memory device 22.

The browse command button 44 is configured to allow a user to view directories and file names stored in the memory device 22 such that the user can select the log file 30, utilizing the mouse 28.

The perform pattern analysis command button 46 is configured to allow a user to instruct the computer 20 to analyze the log file 30 specified in the log file text box 42, to determine multiple repeating patterns of log file records automatically generated by a software program and stored in the log file 30. In particular, when the user selects the perform pattern analysis command button 46, the computer 20 analyzes each record in the log file 30 to determine substantially similar log file records that are duplicated in the log file 30 at predetermined time intervals. The substantially similar log file records that are duplicated in the log file 30 at predetermined time intervals are identified and flagged by the computer 20 as being in a repeating pattern of log files. Referring to FIG. 3, an exemplary log file 30 includes exemplary records 72, 74, 76, 78, 80, 82, 84, 86, 88, 90, 92 and 94. The log file records 72, 76, 82, 88 correspond to a first repeating pattern of log file records in the log file 30 generated on 15-minute intervals, designated as "AAA." The log file records 74, 80, 84, 86 correspond to a second repeating pattern of log file records in the log file 30 generated on 10-minute intervals, designated as "BBB." The log file records 78, 90, 92, 94 correspond to a third repeating pattern of log file records in the log file 30 generated on 40-minute intervals, designated as "CCC."

Referring to FIGS. 2 and 4, in one exemplary embodiment, the computer 20 is configured to analyze the log file 30 to determine the repeating patterns of log file records, designated as AAA, BBB, and CCC. Further, the computer 20 is configured to induce the graphical user interface 40 to display the log file records 72, 74, 78 in the text frame 48 representing the repeating patterns of log file records AAA, BBB, CCC, respectively. Further, the computer 20 induces the graphical user interface 40 to display the pattern selection checkboxes 50, 52, 54 designated as AAA, BBB, and CCC, respectively.

The start command button 56 is configured to allow a user to instruct the computer 20 to monitor additional log file records that are added to the log file 30 to identify added log file records that have command-related attributes that differ from command-related attributes in corresponding repeating patterns of log file records that were previously identified utilizing the perform pattern analysis command button 46. In one exemplary embodiment, the computer 20 determines additional log file records having command-related attributes that differ from command-related attributes in one or more of the selected patterns of log file records AAA, BBB, and CCC.

The user can select one or more of the patterns AAA, BBB, CCC utilizing the pattern selection checkboxes 50, 52, 54, respectively.

The stop command button 58 is configured to allow a user to instruct the computer 20 to stop monitoring additional log file records that are added to the log file 30.

Figure 5:
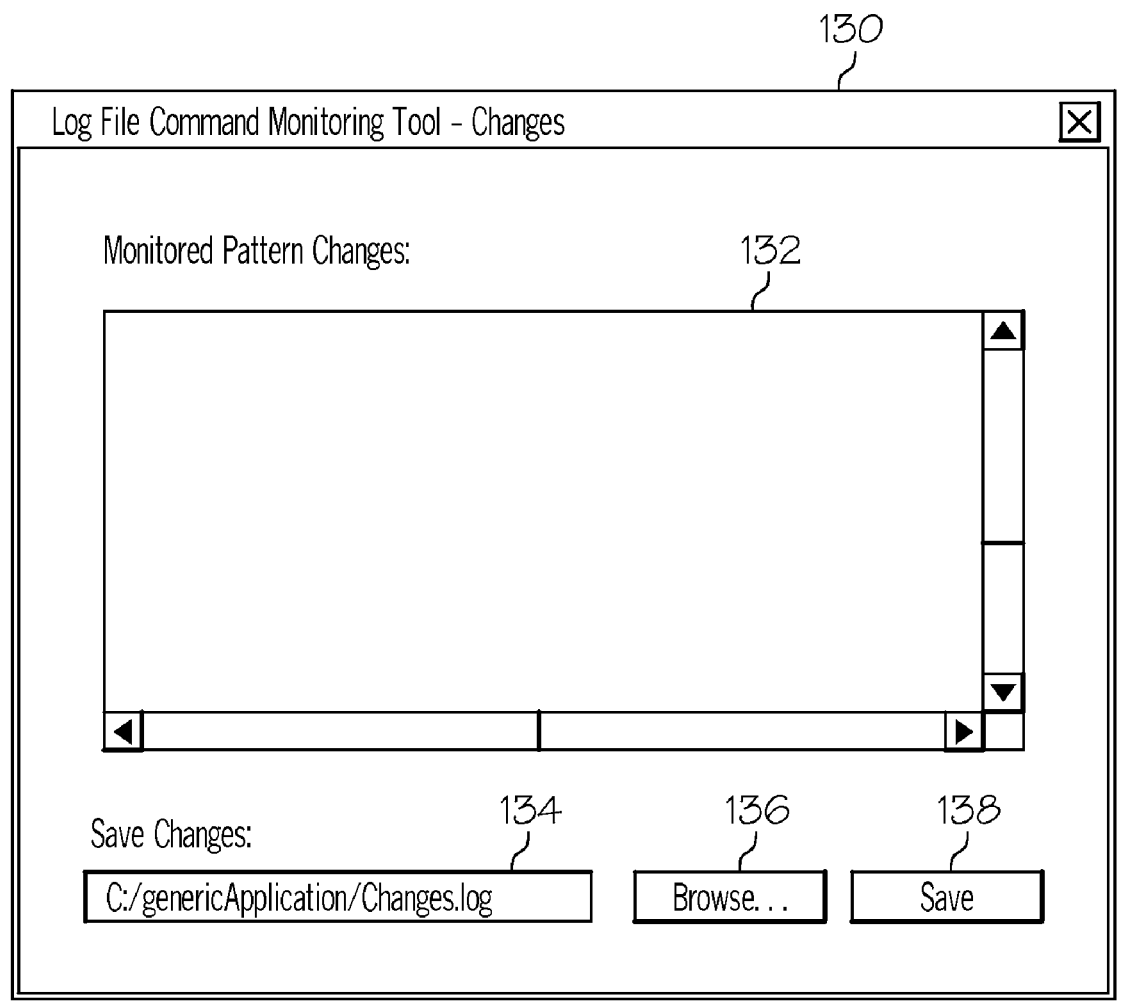
FIG. 5 is a schematic of another graphical user interface generated by the system of FIG. 1.

Referring to FIG. 5, the graphical user interface 130 will now be explained in greater detail. The graphical user interface 130 includes a text frame 132, a file name text box 134, a browse command button 136, and a save command button 138. The text frame 132 is configured to display added log file records that have command-related attributes that differ from command-related attributes in associated repeating patterns of log file records that were previously identified. The file name text box 134 is configured to allow a user to input a directory path and a file name, utilizing the keyboard 26, for a file that will be stored in the memory device 22 having only the identified log file records. The browse command button 136 is configured to allow a user to select a directory and a file name for a file that the computer 20 will store the identified log records therein. The browse command button 136 is selected via the mouse 28. The save command button 138 is configured to allow a user to save the file specified in the file name text box 134.

Referring to FIG. 6, exemplary log file records that are added to the log file 30 after determining the repeating patterns of log file records are illustrated. As shown, in one exemplary embodiment, the log file 30 further includes log file records 150, 152, 154, 156, 158, 160, 162, 164, 166, 168, 170 and 172. The log file records 150, 154, 160, 166 are associated with the repeating pattern of log file records AAA. The log file records 152, 158, 162, 164 are associated with the repeating pattern of log file records BBB. The log file records 156, 168, 170, 172 are associated with the repeating pattern of log file records CCC. The computer 20 monitors the log file records 150, 154, 160, 166 associated with pattern AAA every 15 minutes to confirm whether there is a problem record whose status is set to "CLOSED" whose notification has not been sent to a customer. The computer 20 further monitors the log file records 152, 158, 162, 164 associated with pattern BBB. However, presuming that a developer has mistakenly changed an SLA command-related attribute or parameter between 7:10 P.M. and 7:20 P.M., so that the system is checking log file records associated with the pattern BBB every 10 minutes to see if there are any incident records that were opened more than 55 minutes ago and whose status is still "NEW." The change to the log file records 162, 164 due to the operator error are underlined in FIG. 6. Thus, there is now a possibility for incident records opened after 6:40 P.M. to have their SLA breached since the original goal of the software checks was to ensure that all tickets were assigned to a workgroup at latest 30 minutes after they were opened. Therefore, since the software is now checking for tickets that were opened 55 minutes ago, the tickets that were opened 30 minutes before the developer's change and later (i.e. that were opened at 6:40 pm and later) would be breached, because the reportdate value it is checking is too far in the past. So it would not be able to automatically assign the ticket to a workgroup in time to avoid the SLA breach.

Accordingly, the computer 20 is configured to detect that the log file records 162, 164 have command-related attributes that do not correspond to the command-related attributes in the repeating pattern of log file records BBB. Further, the computer 20 is configured to display the log file records 162, 164 in the text frame 132 of the graphical user interface 130. Further, the computer 20 is configured to generate an email including both an alert message and the log file records 162, 164, which is sent to a predetermined email account for notifying a manager of the change in the log file records.

Figure 8:
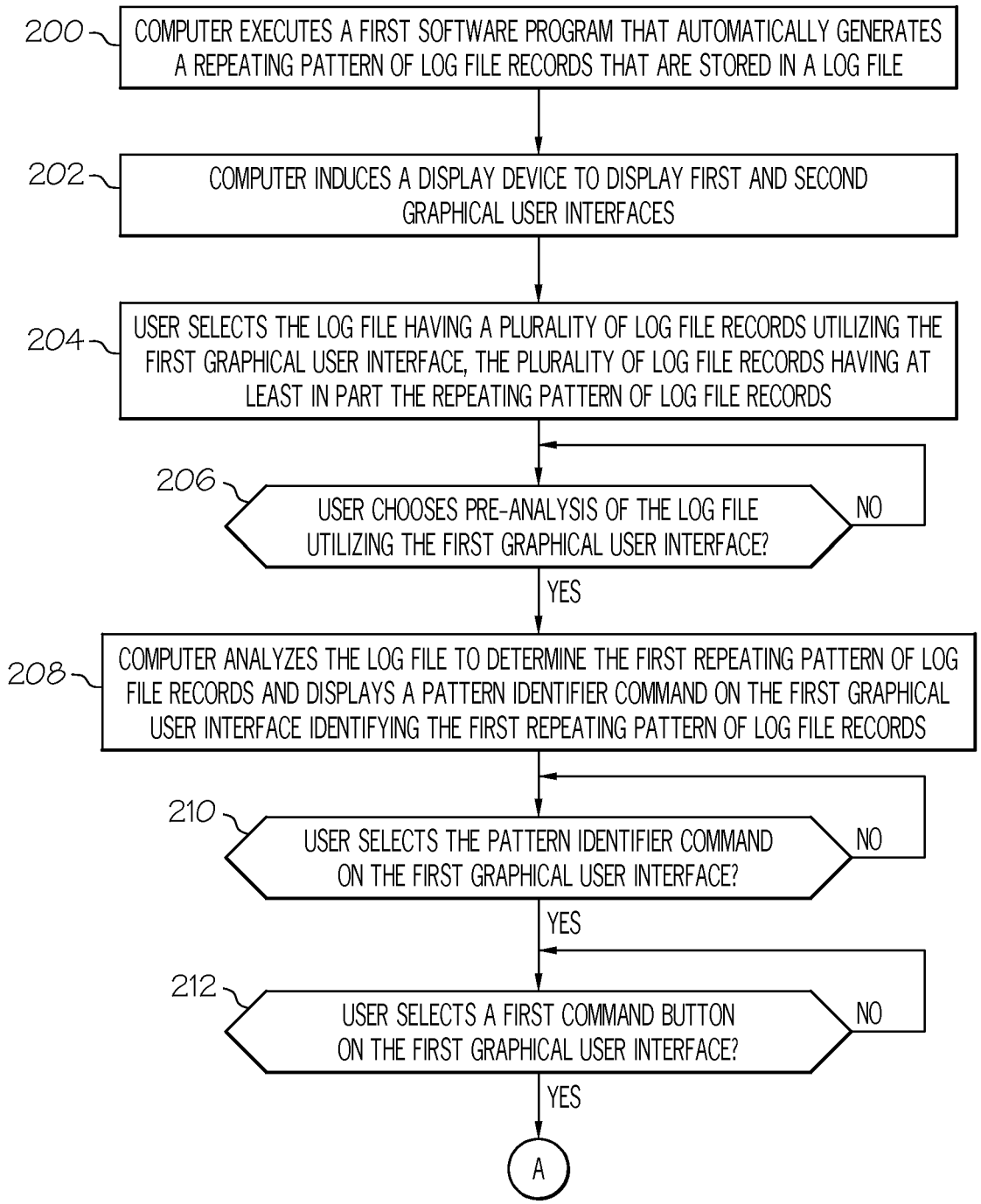
FIGS. 8-9 are flowcharts of a method for identifying a log file record in a log file in accordance with another exemplary embodiment.
Figure 9:
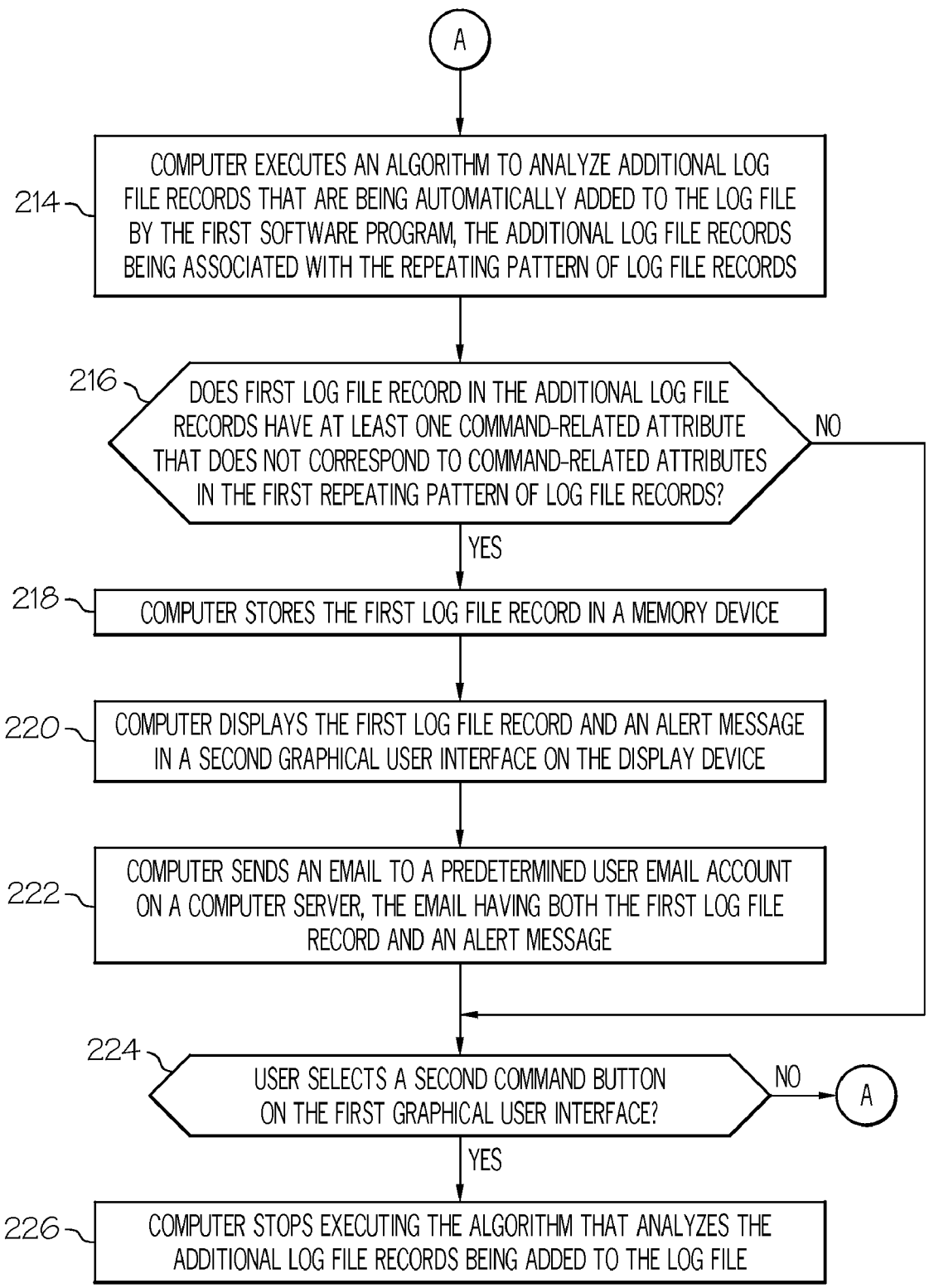

Referring to FIGS. 8-9, a flowchart of a method for identifying a log file record that has command-related attributes that differ from command-related attributes in a repeating pattern of log file records will now be explained. It should be noted that although only one log file record is identified in the method for purposes of simplicity, the method could be utilized to identify a plurality of log file records in a log file.

At step 200, the computer 20 executes a first software program that automatically generates a repeating pattern of log file records that are stored in the log file 30.

At step 202, the computer 20 induces the display device 44 to display first and second graphical user interfaces 40, 130.

At step 204, the user selects the log file 30 having a plurality of log file records 72, 74, 76, 78, 80, 82, 84, 86, 88, 90, 92, 94 utilizing the first graphical user interface 40. The plurality of log file records 72, 74, 76, 78, 80, 82, 84, 86, 88, 90, 92, 94 having at least in part the repeating pattern of log file records.

At step 206, the computer 20 makes a determination as to whether the user chooses pre-analysis of the log file 30 utilizing the first graphical user interface 40. In particular, the computer 20 makes a determination as to whether a user has selected the performed pattern analysis command button 46 on the graphical user interface 40. If a value of step 204 equals "yes", the method advances to step 208. Otherwise, the method returns to the step 206.

At step 208, the computer 20 analyzes the log file to determine the first repeating pattern of log file records 74, 80, 84, 86 and displays a pattern identifier command (e.g., checkbox 52) on the first graphical user interface 40 identifying the first repeating pattern of log file records BBB.

At step 210, the computer 20 makes a determination as to whether the user selects the pattern identifier command (e.g., checkbox 52) on the first graphical user interface 40. If the value of step 210 equals "yes", the method advances to step 212. Otherwise, the method returns to step 210.

At step 212, the computer 20 makes a determination as to whether the user selected a first command button (e.g., start command button 56) on the first graphical user interface 40. If the value of step 212 equals "yes", the method advances to step 214. Otherwise, the method returns to step 212.

At step 214, the computer 20 executes an algorithm to analyze additional log file records 150, 152, 154, 156, 158, 160, 162, 164, 166, 168, 170, 172 that are being automatically added to the log file 30 by the first software program. The additional log file records file records 152, 158, 162, 164 are associated with the repeating pattern of log file records BBB are associated with the repeating pattern of log file records BBB.

At step 216, the computer 20 makes a determination as to whether a first log file record 162 in the additional log file records has at least one command-related attribute that does not correspond to command-related attributes in the first repeating pattern of log file records BBB. If the value of step 216 equals "yes", the method advances to step 218. Otherwise, the method advances to step 224.

At step 218, the computer 20 stores the first log file record 162 in the memory device 22.

At step 220, the computer 20 displays the first log file record 162 and an alert message in the second graphical user interface 130 on the display device 24.

At step 222, the computer 20 sends an email to a predetermined user email account on the computer server 29. The email has both the first log file record 162 and an alert message.

At step 224, the computer 20 makes a determination as to whether the user has selected a second command button (e.g., stop command button 58) on the first graphical user interface 40. If the value of step 224 equals "yes", the method advances to step 226. Otherwise, method returns to step 214.

At step 226, computer 20 stops executing the algorithm that analyzes the additional log file records being added to the log file 30. After step 226, the method is exited.

Referring again to FIG. 2, an exemplary method for determining sets of repeating patterns of log file records in a log file that is performed by selection of the perform pattern analysis command button 46 will now be explained. An underlying presumption in the method is that the log file contains only the repeating patterns of log file records and no other records when the perform pattern analysis command button 46 is selected.

At a first step, the computer 20 analyzes the entire log file, starting from a first line.

At a second step, the computer 20 determines a repeating pattern having a shortest time interval. Because the log file records are repeated on a fixed time interval, the shortest repeating pattern will encompass a first log file record in the log file. The first command is denoted as A1 for example.

At a third step, the computer 20 commences from the first log file record and finds a subsequent log file record in the log file that is "similar" to the first log file record to determine a first time interval, and temporarily presumes that all of the log file records between these two records belong to a set of repeating log file records. It should be noted that the third step can utilize currently available techniques to determine similarity, such as the techniques most word processors use to suggest a different spelling for a misspelled word. The similarity determination method can have a predefined threshold, such as two log file records having at least 95% of the same characteristics in order to be considered similar. The similar subsequent command is denoted as A2 for example.

At a fourth step, the computer 20 commences from the similar log file record A2, to find a subsequent log file record in the log file that is also similar to A1 to determine a second time interval. The similar subsequent record is denoted as A3 for example.

At a fifth step, the computer 20 compares a set of log file records between A1 and A2, and between A2 and A3, and removes any new log file records that are between A2 and A3, but are not between A1 and A2, since the removed log file records correspond to records belonging to a set of repeating log file records (e.g., a pattern) with a longer time interval. Further, the computer 20 removes any log file records that are between A1 and A2, but are not between A2 and A3 since these removed log file records correspond to records belonging to another set of repeating log file records or a pattern with a longer time interval. Thereafter, the set of log file records between A1 and A2, and between A2 and A3 should now be the same, thus comprising a set of repeating log file records having a shortest time interval. This set of repeating log file records having the short time interval is stored in temporary storage and are denoted as pattern A for example.

At a sixth step, from a top of the log file, the computer 20 determines a first log file record that does not appear in the pattern A and denotes this as a start of pattern B1.

At a seventh step, the computer 20 repeats the third through fifth steps using the log file record B1 as a starting point.

At an eighth step, with the pattern B from the fifth step, the computer 20 removes any log file records in that pattern that belong to pattern A. The computer stores a second set of repeating log file records in the temporary storage and denotes them as pattern B for example.

At a ninth step, the computer 20 repeats the sixth through eighth steps for each successively longer time interval, by finding the log file records that are not in the temporary storage yet. Thus, all of the sets of repeating log file records or patterns are stored with unique identifiers in the temporary storage.

The above-described methods can be at least partially embodied in the form of one or more computer readable media having computer-executable instructions for practicing the methods. The computer-readable media comprise one or more of the following: floppy diskettes, CD-ROMs, hard drives, flash memory, and other tangible storage devices known to those skilled in the art; wherein, when the computer-executable instructions are loaded into and executed by one or more computers or computer servers, the one or more computers or computer servers become an apparatus for practicing the invention.

The system, the method, and the computer readable media for identifying a log file record in a log file represent a substantial advantage over other systems, methods, and computer readable media. In particular, the system, the method, and the computer readable media provide a technical effect of identifying a log file record in a log file that has command-related attributes that differ from command-related attributes in a corresponding repeating pattern of log file records in the log file.

While the invention is described with reference to an exemplary embodiment, it will be understood by those skilled in the art that various changes may be made and equivalence may be substituted for elements thereof without departing from the scope of the invention. In addition, many modifications may be made to the teachings of the invention to adapt to a particular situation without departing from the scope thereof. Therefore, it is intended that the invention not be limited to the embodiments disclosed for carrying out this invention, but that the invention includes all embodiments falling with the scope of the appended claims. Moreover, the use of the terms first, second, etc. does not denote any order of importance, but rather the terms first, second, etc. are used to distinguish one element from another.

What is claimed is:

1. A method for identifying a log file record in a log file, the log file having a plurality of log file records therein, the method comprising:

a computer displaying a first graphical user interface on a display device;

the computer receiving a selection of the log file via the first graphical user interface;

the computer analyzing the log file to determine a repeating pattern in the log file records, wherein the analyzing includes identifying substantially similar log file records that are duplicated at a periodic time interval, wherein each of the substantially similar log file records comprises a problem ticket status;

the computer detecting a selection of a first command button on the first graphical user interface, and in response, the computer executing an algorithm to analyze additional log file records that were automatically added to the log file by a software program, the additional log file records being associated with the substantially similar log file records; and the computer determining that a first log file record in the additional log file records has at least one command-related attribute that does not correspond to command-related attributes in the substantially similar log file records, and in response, the computer storing the first log file record in a memory device.

2. The method of claim 1, further comprising:
before the computer analyzing the log file to determine the repeating pattern, the computer detecting a selection of an analysis command button on the first graphical user interface;
wherein the computer analyzing the log file to determine the repeating pattern comprises the computer executing another algorithm to analyze the log file to determine the repeating pattern.

3. The method of claim 1, further comprising the computer detecting a selection of a pattern identifier command on the first graphical user interface, the pattern identifier corresponding to the repeating pattern.

4. The method of claim 1, further comprising the computer displaying the first log file record in a second graphical user interface on the display device.

5. The method of claim 1, further comprising the computer sending an email to a predetermined user email account having both the first log file record and an alert message.

6. The method of claim 1, wherein each record of the substantially similar log file records comprises a Structured Query Language (SQL) statement, the SQL statement comprising a query identifying the problem ticket status of the record.

7. The method of claim 1, further comprising:
the computer determining whether there is a second log file record in the additional log file records having a closed problem ticket status and for which a notification has not been sent.

8. A system for identifying a log file record in a log file, the log file having a plurality of log file records, the system comprising:
a memory device having the log file stored therein;
a computer operably communicating with the memory device, the computer configured to display a first graphical user interface on a display device, the first graphical user interface configured to allow a user to select the log file;
the computer further configured to analyze the log file to determine a repeating pattern in the log file records, wherein the analyzing the log file to determine the repeating pattern in the log file records includes identifying substantially similar log file records that are duplicated at a periodic time interval, wherein each of the substantially similar log file records comprises a problem ticket status;
the first graphical user interface further configured to allow the user to select a first command button on the first graphical user interface;
the computer further configured to detect a selection of the first command button on the first graphical user interface, and in response, to execute an algorithm to analyze additional log file records that were automatically added to the log file by a software program, the additional log file records being associated with the repeating pattern; and
the computer further configured to determine when a first log file record in the additional log file records has at least one command-related attribute that does not correspond to command-related attributes in the substantially similar log file records, and in response, to store the first log file record in the memory device.

9. The system of claim 8, wherein the first graphical user interface has an analysis command button, and wherein the computer is further configured to execute another algorithm to analyze the log file to determine the repeating pattern in response to detecting a selection of the analysis command button.

10. The system of claim 8, wherein the first graphical user interface has a pattern identifier command for selecting a pattern identifier corresponding to the repeating pattern.

11. The system of claim 8, wherein the computer is further configured to display the first log file record in a second graphical user interface on the display device.

12. The system of claim 8, wherein the computer is further configured to send an email to a predetermined user email account having both the first log file record and an alert message.

13. The system of claim 8, wherein each record of the substantially similar log file records comprises a Structured Query Language (SQL) statement, the SQL statement comprising a query identifying the problem ticket status of the record.

14. The system of claim 8, wherein the computer is further configured to determine whether there is a second log file record in the additional log file records having a closed problem ticket status and for which a notification has not been sent.

15. One or more computer readable tangible storage devices having computer-executable instructions implementing a method for identifying a log file record in a log file, the method comprising:
displaying a first graphical user interface on a display device;
receiving a selection of a log file having a plurality of log file records therein via the first graphical user interface;
analyzing the log file to determine a repeating pattern in the log file records, the analyzing including identifying substantially similar log file records that are duplicated at a periodic time interval, wherein each of the similar log file records comprises a problem ticket status;
receiving an instruction to analyze additional log file records in the log file that are substantially similar to the identified substantially similar log file records and that are duplicated at the periodic time interval;
analyzing the additional log file records to identify at least one log file record in the additional log file records that has a command-related attribute that does not correspond to the command related attributes in the identified log file records.

16. The one or more computer readable tangible storage devices of claim 15, wherein the method further comprises detecting a selection of a pattern identifier command on the first graphical user interface, the pattern identifier corresponding to the repeating pattern.

17. The one or more computer readable tangible storage devices of claim 15, wherein the method further comprises displaying the at least one log file record in the additional log file records that has a command-related attribute that does not correspond to the command related attributes in the identified substantially similar log file records in a second graphical user interface on the display device.

18. The one or more computer readable tangible storage devices of claim 15, wherein the method further comprises sending an email to a predetermined user email account having both the at least one log file record in the additional log file records that has a command-related attribute that does not correspond to the command related attributes in the identified substantially similar log file records and an alert message.

19. The one or more computer readable tangible storage devices of claim 15, wherein each record of the identified substantially similar log file records comprises a Structured Query Language (SQL) statement, the SQL statement comprising a query identifying the problem ticket status of the record.

20. The one or more computer readable tangible storage devices of claim 15, wherein the method further comprises determining whether there is a log file record in the additional log file records having a closed problem ticket status and for which a notification has not been sent.

* * * * *